United States Patent [19]

Stoddard

[11] 4,234,857
[45] Nov. 18, 1980

[54] CENTRIFUGAL GASDYNAMIC WINDOW

[75] Inventor: Frank J. Stoddard, Huntington Beach, Calif.

[73] Assignee: Calspan Corporation, Buffalo, N.Y.

[21] Appl. No.: 30,034

[22] Filed: Apr. 13, 1979

[51] Int. Cl.³ .................................................. H01S 3/02
[52] U.S. Cl. ........................ 331/94.5 G; 331/94.5 D; 350/319
[58] Field of Search .................... 331/94.5 D, 94.5 G; 350/319, 285

[56] References Cited

U.S. PATENT DOCUMENTS

| 3,307,485 | 3/1967 | Logue | 415/88 |
| 3,328,113 | 6/1967 | Dimmick et al. | 350/285 |
| 3,588,249 | 6/1971 | Studebaker | 331/94.5 R |
| 3,926,527 | 12/1975 | Pembrook et al. | 350/319 |

OTHER PUBLICATIONS

"Development of Some Unconventional Centrifugal Dumps", by Barske et al., *Proc. Inst. Mech. Engrs.*, vol. 174, No. 11 (1960).
"Investigations on the Pumping Effects of Rotating Discs", *Proc.* (1975), *Inst. of Mech. Engrs.*, vol. 189 36/75, pp. 341–349.

*Primary Examiner*—William L. Sikes
*Assistant Examiner*—Leon Scott, Jr.
*Attorney, Agent, or Firm*—Allen J. Jaffe; David J. Zobkiw

[57] ABSTRACT

An unimpeded optical path across a low-pressure supersonic stream of a high-power laser is achieved by rotating a window assembly at a predetermined constant speed. The centrifugal gasdynamic window assembly acts as a centrifugal compressor with no net radial flow. The no net radial flow condition is achieved by matching the compression ratio to the pressure difference between the flowing laser medium and ambient.

3 Claims, 5 Drawing Figures

CENTRIFUGAL GASDYNAMIC WINDOW

In a conventional laser apparatus, a window provides an optical path between the flowing laser medium and the exterior of the cell while serving to maintain the pressure differential between the laser medium and ambient. Such an arrangement results in interfaces between the window and the laser medium as well as the ambient atmosphere. Reflection and refraction at the interfaces, dirt on the window, impurities and irregularities in the window, etc. all can cause losses and distortions to the laser beam. For high-power lasers the small amount of energy absorption occurring on the surface or within the window can result in a mechanical failure of the window.

It is an object of this invention to provide an unimpeded optical path across a low-pressure supersonic stream in high-power lasers.

It is a further object of this invention to have an undamageable window for high-power lasers.

It is an additional object of this invention to provide a window having reduced optical distortion. These objects, and others as will become apparent hereinafter, are accomplished by the present invention.

Basically, in the present invention, conventional window structure is replaced with a rotatable window assembly. When the window assembly is rotated at the proper speed, determined by the pressure difference between the low-pressure laser medium and the higher pressure ambient, it acts as a centrifugal compressor but with no net outward flow of laser medium due to the pumping effects of the window assembly. As a result, no significant leakage of laser medium takes place, nor is there any flow of ambient into the laser medium as would occur if a conventional window were merely removed to provide an optically clear path for the laser beam.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENTS

Figure 1:
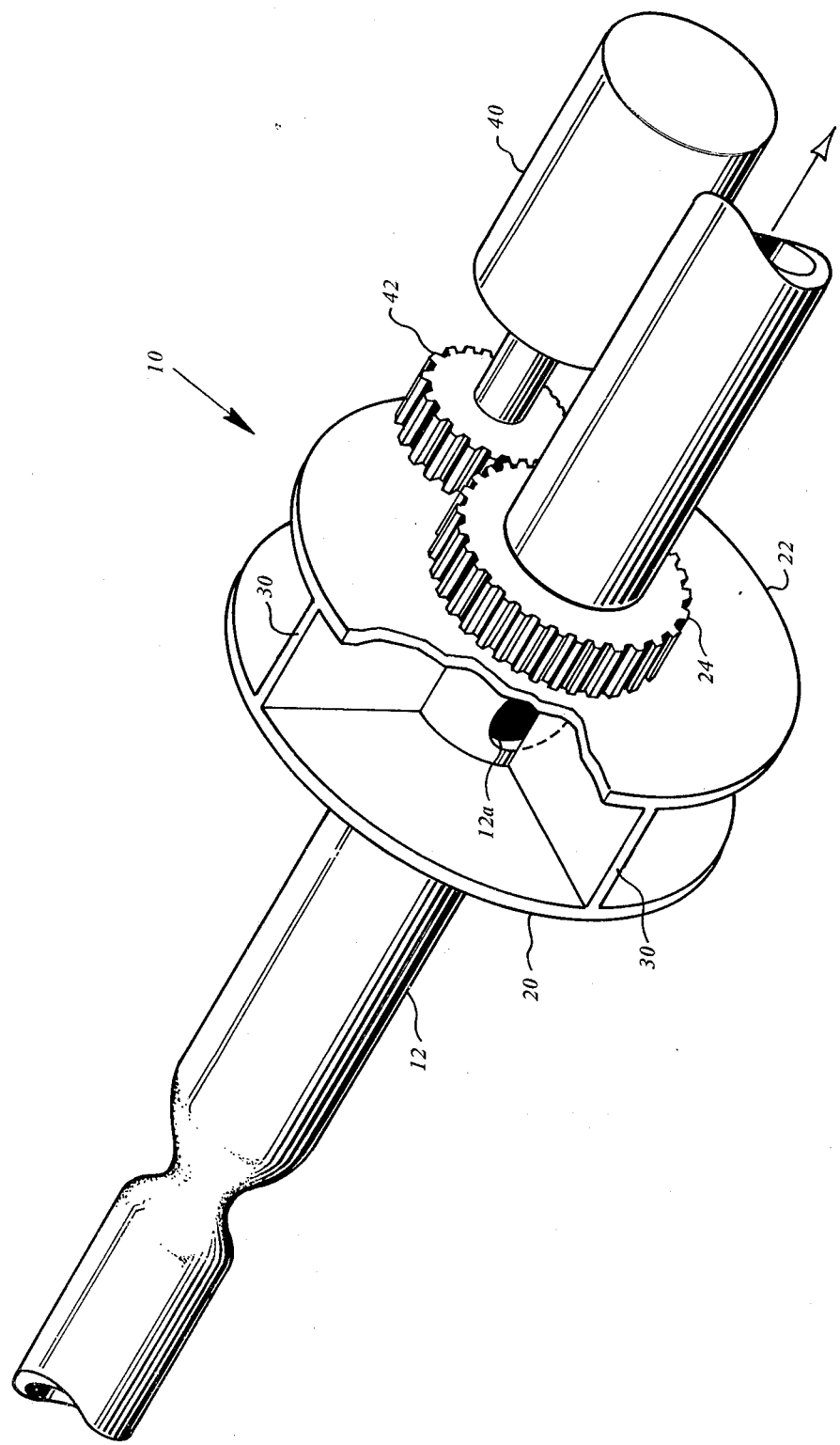
FIG. 1 is a pictorial representation of a centrifugal gasdynamic window.
Figure 2:
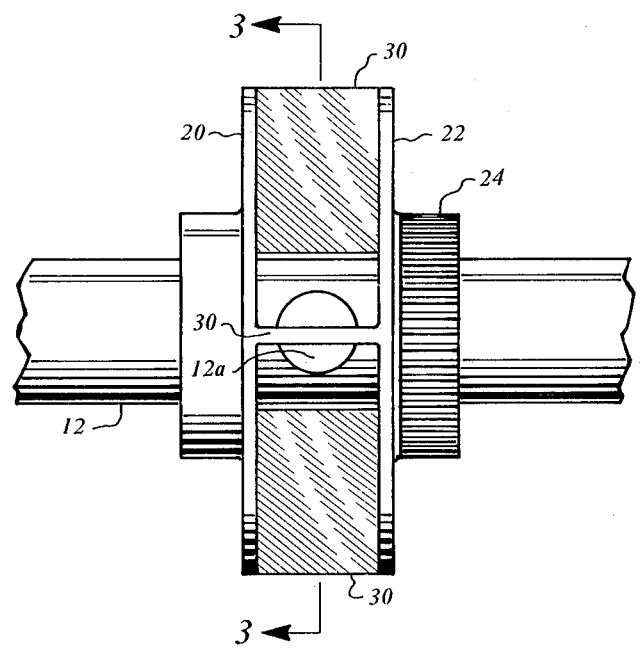
FIG. 2 is a side view of the device of FIG. 1.
Figure 3:
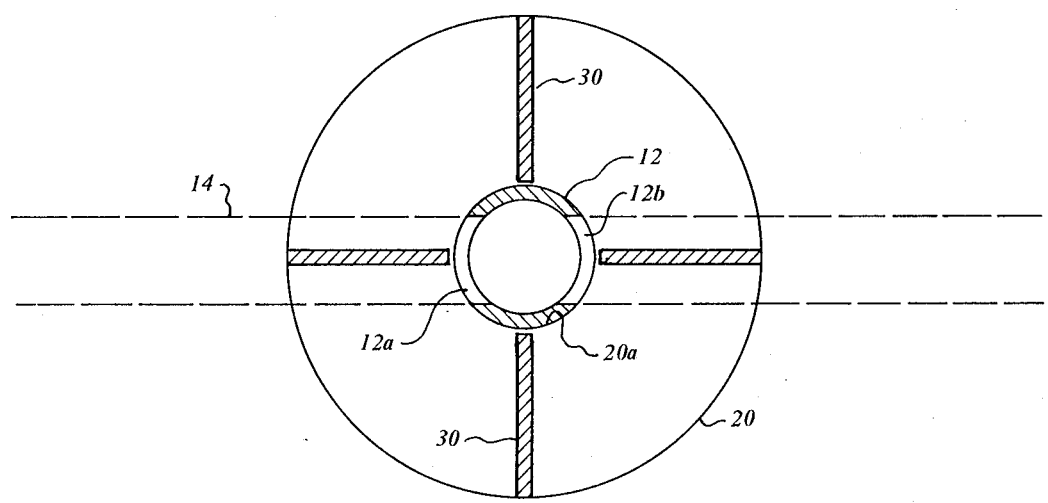
FIG. 3 is a sectional view taken along line 3—3 of FIG. 2.

Referring to FIGS. 1-3, the numeral 10 generally designates a gasdynamic window assembly which sealingly surrounds laser tube 12 which contains a flowing laser medium. Laser tube 12 has radial ports 12a and b through which the laser beam 14 emerges perpendicular to the axis of laser tube 12. The window assembly 10 includes hubbed discs 20 and 22 and vanes 30. Disc 22 has a gear 24 formed in the hub thereof and both discs 20 and 22 have bearing surfaces which permit window assembly 10 to rotate, but only bearing surface 20a is illustrated. Window assembly 10 is driven by adjustable, constant-speed motor 40 through gear 42 which is in engagement with gear 24.

OPERATION

In operation, window assembly 10 is accelerated to a specified rotational speed by motor 40 which holds the speed constant. This specified rotational speed is determined by the condition that the steady-state radial static pressure field produced between discs 20 and 22 by centrifugal effects be such as to match exactly the static pressure of the laser medium flowing in tube 12 and the ambient static pressure while at the same time producing no net radial flow. Thus, at the desired rotational speed, the centrifugal gasdynamic window assembly 10 acts as a centrifugal compressor operating at its maximum design compression ratio where the throughput is zero. In this ideal limit, the power consumption of the window is determined by windage and friction losses. In practice some leakage will occur through the center of the hubs of discs 20 and 22 and some small pumping loss will be present.

The value of the specified rotational speed can be reduced for a given internal-to-external pressure ratio by cooling the window assembly 10 and by resorting to high molecular weight noble gases outside the laser tube 12. Windage losses can be reduced by enclosing the outward faces of the discs 20 and 22 in an evacuated can through the use of labyrinth seals on the edge of the can near the outer edges of the disc faces.

Figure 4:
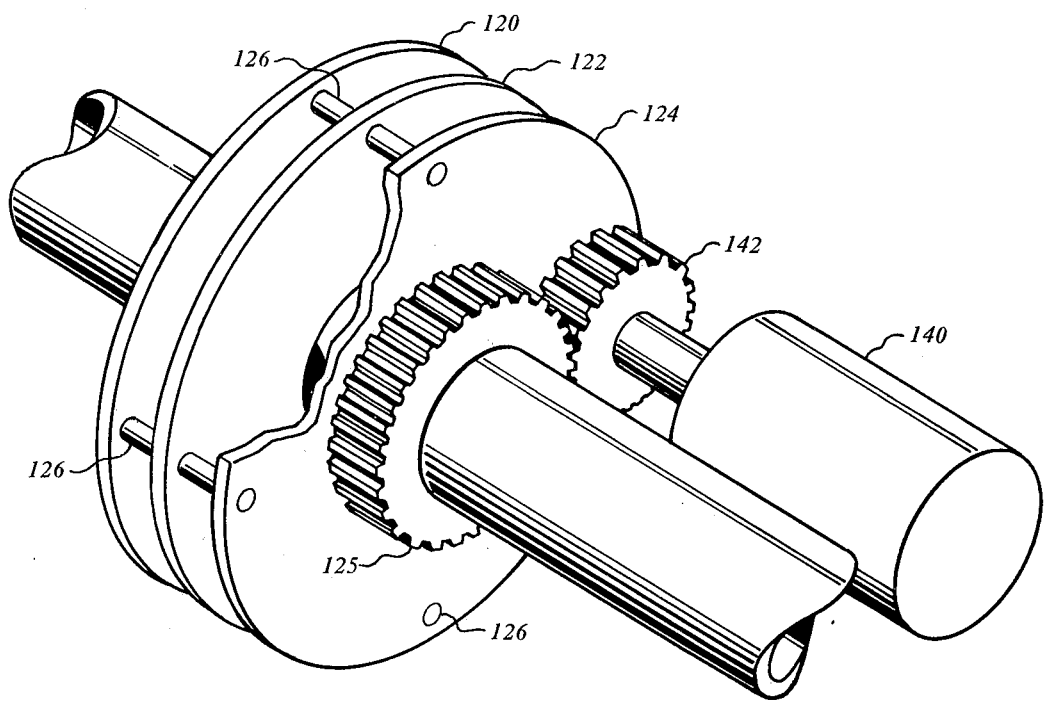
FIG. 4 is a pictorial representation of a modified centrifugal gasdynamic window.
Figure 5:
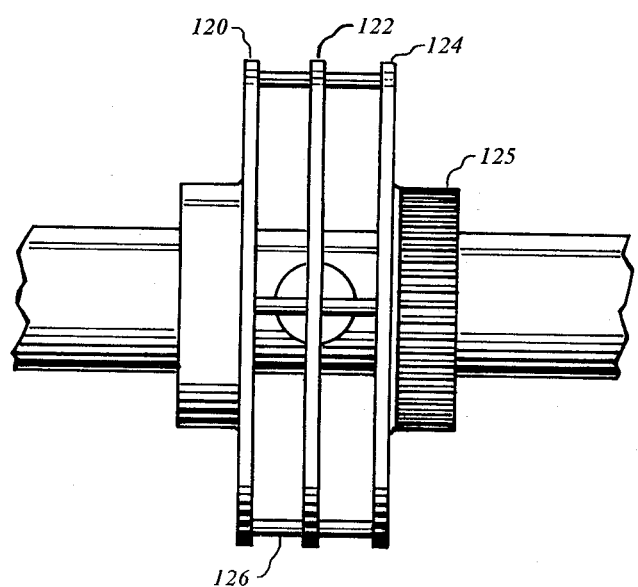
FIG. 5 is a side view of the device of FIG. 4.

The vanes 30 of the device of FIGS. 1-3 are shown as solid but could be perforated or replaced by screens. In fact, as shown in FIGS. 4 and 5 the vanes may be eliminated entirely. The discs 120, 122 and 124 are secured in a spaced relationship by pins 126. Disc 124 has a geared hub 125 located thereon which is operatively connected to adjustable, constant-speed motor 140 through gear 142. The operation of the device of FIGS. 4 and 5 is the same as that in FIGS. 1-3 except for the details of the pumping mechanism which is explained in detail in the Reference.

Although preferred embodiments of the present invention have been illustrated and described, other changes will occur to those skilled in the art. For example, the number of vanes and discs may be changed and in the device of FIGS. 4 and 5 two discs having individual drive and control mechanism can be used. Also, feedback means can be used to control the disc rotational speed in response to changes in temperature and pressure in the laser medium and/or ambient. It is therefore intended that the scope of the present invention is to be limited only by the scope of the appended claims.

REFERENCE

U. M. Barske, "Investigations on the Pumping Effect of Rotating Discs", Proceedings 1975, The Institution of Mechanical Engineers, Vol. 189 36/75, pp 341-349.

I claim:

1. In a flowing gas laser having a laser tube with radially extending ports for the passage of a laser beam, the improvement consisting of a centrifugal gasdynamic window assembly for establishing a fluid seal between a laser medium in the laser tube and ambient atmosphere while permitting passage of the laser beam through the radially extending ports and including:

two rotatable discs;

means for maintaining said discs in a spaced relationship and on respective sides of said ports;

means for causing said discs to rotate as a unit at a predetermined speed about the laser tube whereby a radially extending pressure gradient is established between said discs which prevents flow between the laser medium and atmosphere while permitting passage of the laser beam between said discs.

2. The improvement of claim 1 wherein said means for maintaining said discs in a spaced relationship includes vanes.

3. In a flowing gas laser having a laser tube with radially extending ports for the passage of a laser beam, the improvement consisting of a centrifugal gasdynamic window assembly for establishing a fluid seal between a laser medium in the laser tube and ambient atmosphere while permitting passage of the laser beam through the radially extending ports and including:
- a plurality of rotatable discs;
- means for maintaining said discs in an axially spaced relationship corresponding to the axial extent of said ports;
- means for causing said discs to rotate at a predetermined speed about the laser tube whereby a radially extending pressure gradient is established between said discs which prevents flow between the laser medium and atmosphere while permitting passage of the laser beam between said discs.

* * * * *